Figure 1:
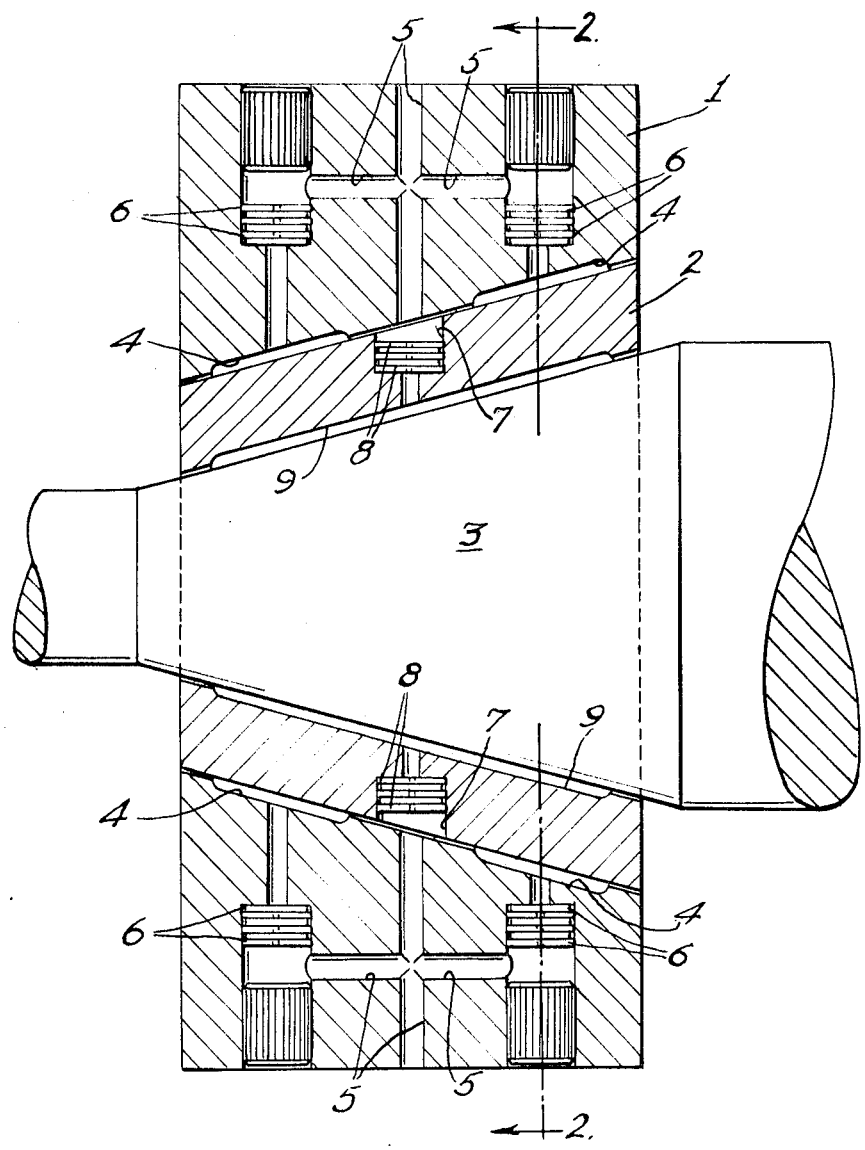

United States Patent [19]
Johansson

[11] 3,754,800
[45] Aug. 28, 1973

[54] HYDROSTATIC BEARING

[75] Inventor: Erik Lennart Waldemar Johansson, Goteborg, Sweden

[73] Assignee: SKF Industrial Trading and Development Company, N.V., Amsterdam, Netherlands

[22] Filed: Jan. 17, 1972

[21] Appl. No.: 218,420

[30] Foreign Application Priority Data
Jan. 25, 1971 Sweden.................................. 790/71

[52] U.S. Cl. .................................................. 308/9
[51] Int. Cl. ............................................. F16c 17/16
[58] Field of Search ......................................... 308/9

[56] References Cited
UNITED STATES PATENTS
3,223,463  12/1965  Porath .................................. 308/9

FOREIGN PATENTS OR APPLICATIONS
1,928,784  12/1970  Germany .............................. 308/9

Primary Examiner—Charles J. Myhre
Assistant Examiner—Frank Susko
Attorney—Dexter N. Shaw, Eugene E. Renz, Jr. et al.

[57] ABSTRACT

A hydrostatic bearing with two bearing surfaces which are movable relative to each other, characterized by a movable element, situated between these surfaces, which element is provided with two surfaces which together with the said bearing surfaces constitute two bearing gaps, one on each side of the intermediate element, and that the intermediate element, because of the friction occuring in the respective gaps when the first mentioned bearing surfaces are moving relative to each other, is moving at a speed which makes the frictional losses in the two gaps equal.

3 Claims, 2 Drawing Figures

HYDROSTATIC BEARING

If hydrostatic bearings are used in such applications where high relative speeds occur between the bearing surfaces, for example in high-speed spindles, cavitation can occur in the intermediate fluid film, which is harmful for the life length and performance of the bearing. The present invention relates to a hydrostatic bearing in which this problem is to a great extent eliminated. According to the invention, the bearing consists of a first and a second bearing surface, intended to move with a high speed relative to each other, and an element situated between these surfaces, which element is provided with bearing surfaces for cooperation with said first and second bearing surface respectively, whereby two hydrostatic bearing gaps are achieved. The intermediate element will thus be floating between two fully developed fluid films. Because of the friction forces which always occur, the intermediate element will be forced to move at a speed which makes the friction power losses in the two gaps equal. By adjusting the friction areas in the two gaps, the intermediate element can be given a desired speed. The relative speed between the first and the second bearing surface will thereby be divided into two sliding surfaces with lower relative speeds and consequently the risk for cavitation diminishes. One embodiment of the invention is shown on the drawing.

Figure 2:
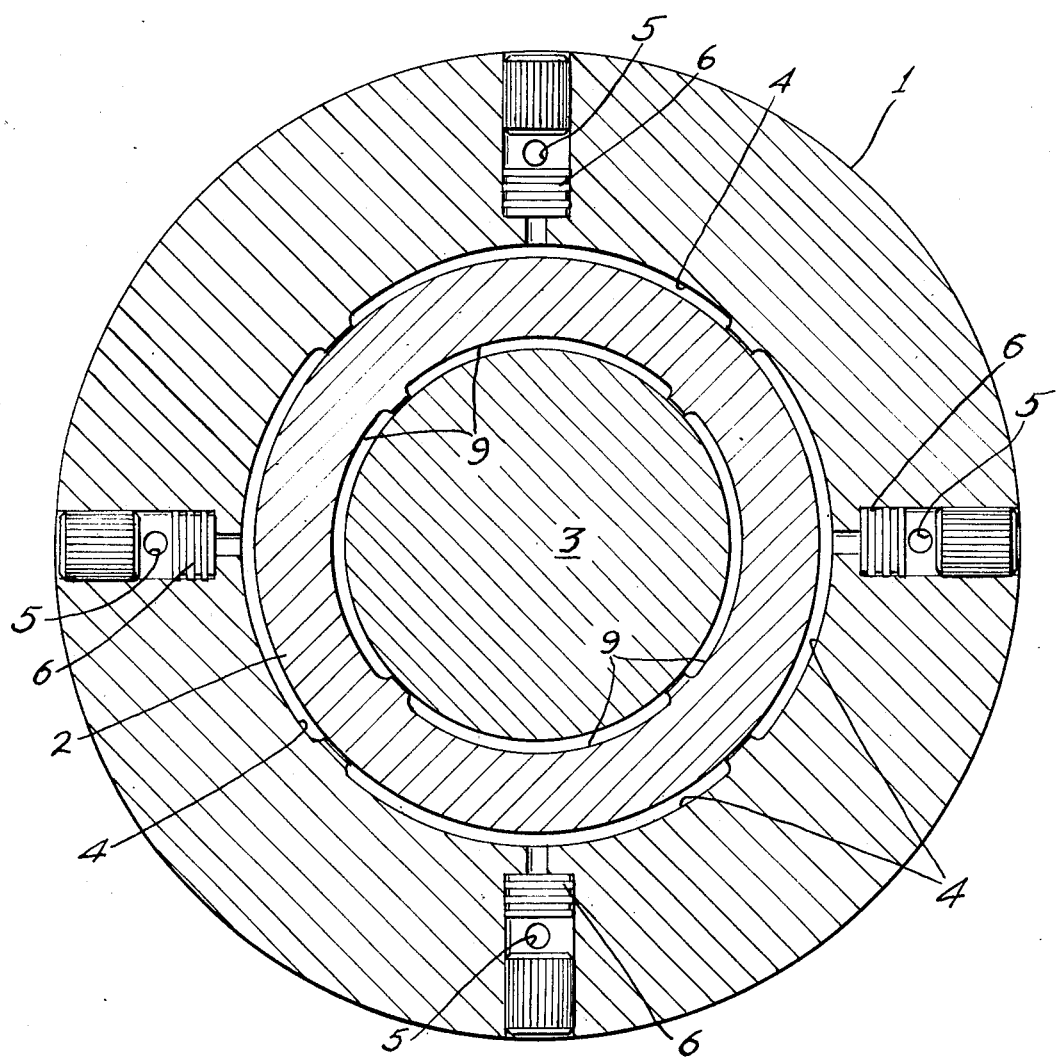

These and other objects of the present invention are hereinafter more fully set forth with reference to the accompanying drawings wherein:

FIG. 1 is a sectional view of a hydrostatic bearing arrangement constructed in accordance with the present invention; and FIG. 2 is a transverse sectional view taken on lines 2—2 of FIG. 1.

In this example, the bearing is made as a tapered hydrostatic bearing for a rotating shaft and comprises a first bearing part 1 in the housing, a tapered intermediate sleeve 2 and a shaft with a tapered part 3. In the bearing part 1 a number of hydrostatic pockets 4 are provided, which pockets are supplied with oil through a number of channels 5 via restrictions 6. These pockets are carrying the intermediate sleeve in a manner well known in hydrostatic bearings. Also, the intermediate sleeve 2 is provided with a number of hydrostatic pockets 9, which cooperate directly with the tapered part of the shaft. These pockets are supplied with oil from the channels 5 via a ring chamber 7 and restrictions 8. The pockets in the intermediate sleeve are carrying the shaft in a manner well known in hydrostatic bearings. When the shaft is rotating, the intermediate sleeve will rotate at a speed which makes the frictional torques equal in the two sliding surfaces.

I claim:

1. The combination comprising a shaft member having a frusto-conical first bearing surface and a bearing part having a frusto-conical second bearing surface, the bearing surfaces being movable relative to one another, a sleeve member of generally frusto-conical shape interposed between said bearing surfaces, said sleeve member having at least one inner hydrostatic pocket confronting said first bearing surface and said bearing part having at least one outer hydrostatic pocket confronting the outer surface of said sleeve, channel means including metering means connecting said pockets to a source of fluid under pressure whereby upon relative rotation of said first and second bearing surfaces, said sleeve member is rotated at a speed which makes the friction losses in the hydrostatic pockets approximately equal.

2. The combination as claimed in claim 1 including a plurality of circumferentially spaced outer hydrostatic pockets in said bearing surface of said bearing part separated by a plurality of circumferentially spaced axial ribs.

3. The combination as claimed in claim 2 including a plurality of inner hydrostatic pockets formed in said sleeve member confronting said first bearing surface and separated by a plurality of circumferentially spaced axial ribs.

* * * * *